United States Patent
Turnbull et al.

(10) Patent No.: US 8,758,480 B2
(45) Date of Patent: Jun. 24, 2014

(54) DYNAMIC AND CONTINUOUS CONTROL FOR PRESSURE SWING ADSORPTION

(75) Inventors: Robert Wellesley Heston Turnbull, Seminole, FL (US); Sunit Srivastava, St. Petersburg, FL (US)

(73) Assignee: Torosoleil, LLC, Seminole, FL (US)

( * ) Notice: Subject to any disclaimer, the term of this patent is extended or adjusted under 35 U.S.C. 154(b) by 202 days.

(21) Appl. No.: 13/229,560

(22) Filed: Sep. 9, 2011

(65) Prior Publication Data
US 2013/0061747 A1 Mar. 14, 2013

(51) Int. Cl.
*B01D 53/047* (2006.01)
*B01D 53/04* (2006.01)

(52) U.S. Cl.
CPC .......... *B01D 53/047* (2013.01); *B01D 53/0454* (2013.01); *B01D 2253/108* (2013.01); *B01D 2256/12* (2013.01); *B01D 2257/102* (2013.01); *B01D 2259/40009* (2013.01); *B01D 2259/402* (2013.01)
USPC .................. 95/8; 95/11; 95/22; 95/23; 95/96; 95/130; 96/110; 96/111; 96/113; 96/117; 128/204.21

(58) Field of Classification Search
CPC ............. B01D 53/047; B01D 53/0454; B01D 2253/108; B01D 2256/12; B01D 2257/102; B01D 2259/4009; B01D 2259/402
USPC ............... 95/1, 8, 11–13, 19, 21–23, 96, 130; 96/109–117, 121; 128/204.21, 204.22
See application file for complete search history.

(56) References Cited

U.S. PATENT DOCUMENTS

| | | | | |
|---|---|---|---|---|
| 4,927,434 A | * | 5/1990 | Cordes et al. | 95/15 |
| 5,071,453 A | * | 12/1991 | Hradek et al. | 96/111 |
| 5,851,293 A | * | 12/1998 | Lane et al. | 118/715 |
| 5,906,672 A | * | 5/1999 | Michaels et al. | 95/12 |
| 6,764,534 B2 | * | 7/2004 | McCombs et al. | 96/111 |
| 8,377,180 B2 | * | 2/2013 | Maeda et al. | 96/110 |
| 2006/0174880 A1 | * | 8/2006 | Jagger et al. | 128/201.25 |
| 2008/0053310 A1 | * | 3/2008 | Bliss et al. | 96/115 |
| 2012/0055483 A1 | * | 3/2012 | Wilkinson et al. | 128/205.27 |

* cited by examiner

*Primary Examiner* — Frank Lawrence, Jr.
(74) *Attorney, Agent, or Firm* — Hahn Loeser & Parks LLP; Carlos P. Garritano

(57) ABSTRACT

A Pressure Swing Adsorption filtration that separates a first set of particles and a second set of particles to produce a purified gas output can be monitored in real-time. A sentinel component can provide real-time in situ tracking of a parameter associated with the PSA filtration and dynamically adjusts the PSA filtration based upon the real-time tracked parameter. The real-time monitoring of the parameter further enables maintenance of equipment utilized with the PSA filtration as well as equipment down-the-line that utilize the purified gas output.

20 Claims, 10 Drawing Sheets

US 8,758,480 B2

DYNAMIC AND CONTINUOUS CONTROL FOR PRESSURE SWING ADSORPTION

BACKGROUND

In general, Pressure Swing Adsorption (PSA) is a filtration process that separates different sized particles. Because of the unique composition of particles and associated varying sizes, a filter membrane or filter medium can be employed to separate particles to obtain a purified product output. In other words, the target purified product output can be controlled by a specific filter medium that adsorbs one type or size of particle and de-adsorbs a second type or size of particle. Typically, pressure is utilized to compress and force the particles through the filter medium, wherein a first set of particles are adsorbed or trapped in the filter medium and a second set of particles are de-adsorbed or passed-through the filter medium. PSA produces a higher concentration of particles (e.g., the passed-through or de-adsorbed particles) that are considered purified for product output due to the filtration or separation provided by trapping or absorbing a portion of particles into the filter medium.

For instance, with Oxygen PSA, Zeolite is utilized as a filter medium since the composition of Zeolite allows Nitrogen to be adsorbed and Oxygen to be passed or de-adsorbed. In other words, Zeolite is a filter medium in which the larger Nitrogen particles are adsorbed and the smaller Oxygen particles are de-adsorbed (e.g., passed-through). Based on the pressurized particles being forced into the filter medium, purified Oxygen is produced since Nitrogen is filtered and captured in the Zeolite filter medium. The filtration of Nitrogen from Oxygen is just one example for a PSA process and, dependent on the filter medium, PSA can be used to filter various particles from one another to produce a purified product output.

PSA, regardless of the target purified output product, is an extremely sensitive process. In a particular example, a filter medium can crack if pressure reaches a particular level. Once a filter medium cracks, debris and dust from the filter medium often damages the PSA equipment as well as other down-the-line equipment. This often leads to costly equipment repair and/or replacement. However, if the pressure is not at a high enough level, the filtration process will not be optimized and will not produce purified product output efficiently. Thus, operation of PSA techniques includes a larger-than-desired amount of guess work.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure generally pertains to real-time detection of at least one parameter associated with a Pressure Swing Adsorption (PSA) filtration process. A parameter associated with the PSA filtration process can be monitored in real-time, wherein the parameter can be, for instance, a pressure, a concentration, a flow rate, a debris count of a filter medium, a temperature, a dew point, a moisture level, among others. The real-time detected parameter can be analyzed in connection with a respective threshold value. Based upon such analysis, the PSA filtration process can be controlled and/or adjusted. This dynamic and continuous control can include, for instance, an adjustment of a monitored parameter, a de-activation/activation of a component utilized with the PSA filtration process, a de-activation/activation of a down-the-line component that utilizes the purified gas output produced, among others. Moreover, an alarm notification can be triggered based upon the analysis of the real-time parameter(s) with a respective threshold value.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Details below are generally directed toward controlling a Pressure Swing Adsorption (PSA) filtration process based upon real-time data collection related to various parameters and conditions. Generally, PSA is a filtration process that separates particles with a filter medium to produce a purified gas output. During this filtration process, parameters (e.g., pressure, flow rate, purified gas output concentration, temperature, dew point, moisture, etc.) can be continuously tracked in real-time in order to ensure a level of integrity for purified gas output as well as the health of components, devices, and equipment utilized to generate the purified gas output via PSA.

Conventional techniques rely heavily on guess-work in identifying appropriate parameter values for PSA. During this guess-work, PSA equipment can be damaged and/or lost as well as experiencing a severe decline in purified gas output quality. Moreover, PSA environments are not static and estimated parameter values can drift which can lead to an incorrectly calibrated PSA environment and eventually damaged equipment. Overall, adjustments to conventional PSA environments are made typically when equipment is already damaged or purified gas output is of a lesser-than-desired quality. Thus, PSA environments are controlled or adjusted after damage has already occurred to equipment or the purified gas output is already below a required quality level.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
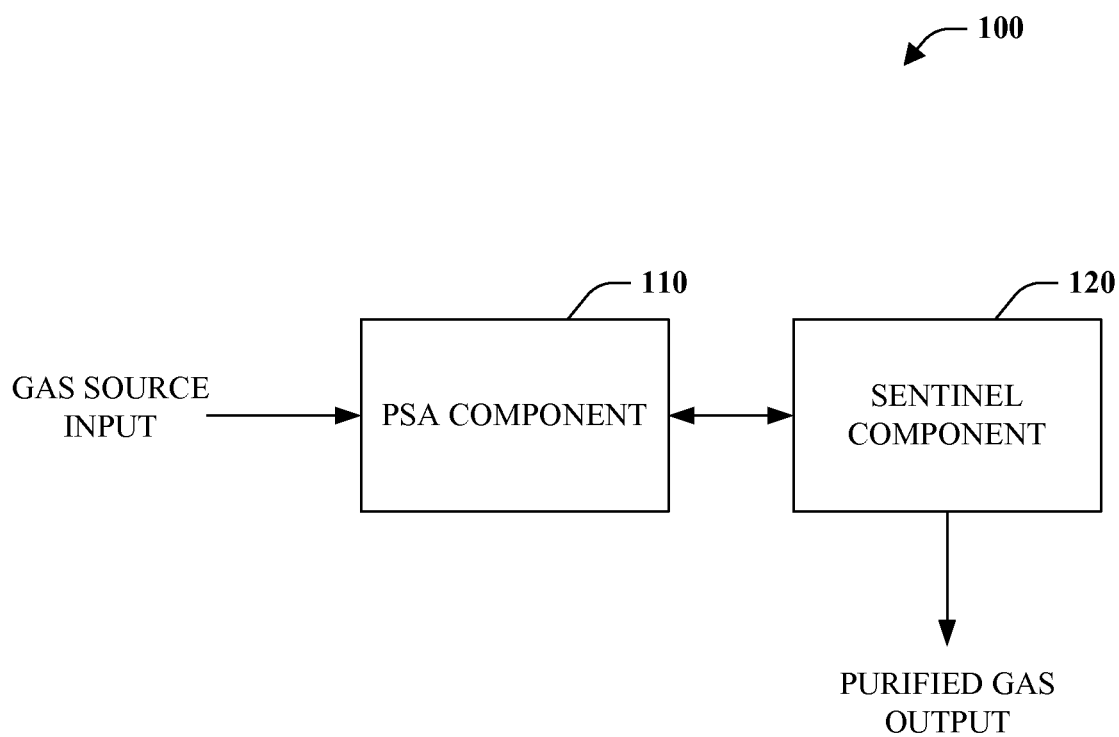
FIG. 1 is a block diagram of a system that facilitates controlling Pressure Swing Adsorption (PSA).

Referring initially to FIG. 1, a system 100 that facilitates controlling Pressure Swing Adsorption (PSA) is illustrated. The system 100 includes a Pressure Swing Adsorption component 110 (herein referred to as "PSA component 110") that generates a purified gas output (e.g., also referred to as a product gas output) from a received gas source input. In particular, the PSA component 110 employs a Pressure Swing Adsorption technique which utilizes pressure and a filter medium in order to filter particles from a gas source input to create a purified gas output. In general, the PSA component 110 can be any suitable component(s) or equipment that can filter gas particles with a filter medium and pressure to produce a purified gas output.

The system 100 further includes a sentinel component 120 that is configured to continuously monitor the PSA component 110 in real-time. In other words, the sentinel component 120 tracks at least one parameter of the generated purified gas output in real-time and in situ (e.g., while not disturbing PSA production of purified output gas). Additionally, the sentinel component 120 can monitor a parameter associated with a component or equipment utilized to produce purified gas output via PSA. For instance, the parameter can be 1) any suitable variable or reading associated with the purified gas output generated by Pressure Swing Adsorption and/or 2) any variable or reading associated with a component or equipment that influences the production of the purified gas output. Although the sentinel component 120 is depicted as a separate component, it is to be appreciated that the sentinel component 120 can be incorporated into the PSA component 110, a separate component, and/or any suitable combination thereof.

The sentinel component 120 is further configured to dynamically control the PSA component 110 based at least in part upon the real-time monitoring of the parameter. Such control can be, for instance, an adjustment of a condition (e.g., pressure, temperature, moisture, concentration, dew point, etc.), a de-activation of the PSA component 110, a de-activation of a component or equipment utilized with Pressure Swing Adsorption, a de-activation of a component that is down-the-line and utilizes the purified gas output, an activation of the PSA component 110, an activation of a component or equipment utilized with Pressure Swing Adsorption, an activation of a component that is down-the-line and utilizes the purified gas output, a suspension in production of the purified output gas, a continuation in production of the purified output gas, among others. Thus, the sentinel component 120 optimizes a Pressure Swing Adsorption process based upon a real-time tracking of at least one parameter. As discussed, conventional systems and techniques associated with Pressure Swing Adsorption employ guess-work operation that is inaccurate and inefficient.

By way of example and not limitation, the PSA component 110 can filter Nitrogen particles from Oxygen particles in ambient air with the employment of a Zeolite filter medium in order to produce purified Oxygen gas output. Parameter(s) of the purified Oxygen gas output as well as parameter(s) associated with the PSA component 110 and/or included equipment/component(s) can be tracked continuously and in real-time by the sentinel component 120. By monitoring such parameter(s) in real-time, the PSA component 110 can be dynamically adjusted and controlled in order to maintain an assured level of quality for the produced purified Oxygen gas output and ensure health to the PSA component 110 and/or equipment/component(s) associated to Pressure Swing Adsorption. Moreover, such real-time tracking ensures the health of down-the-line equipment and/or processes in which the produced purified gas output is utilized. For instance, the sentinel component 120 can detect parameter(s) in real-time related to the purified Oxygen gas, such as, but not limited to, pressure, Oxygen concentration, flow rate, temperature, moisture, dew point, among others. In another instance, the real-time parameter(s) can correspond to equipment/component(s) involved with Pressure Swing Adsorption such as, but not limited to, filter medium life span, filter medium deterioration rate, amount of debris detected from filter medium, duration of time to produce a specified amount of purified gas output, machine temperature, machine age, among others.

Figure 2:
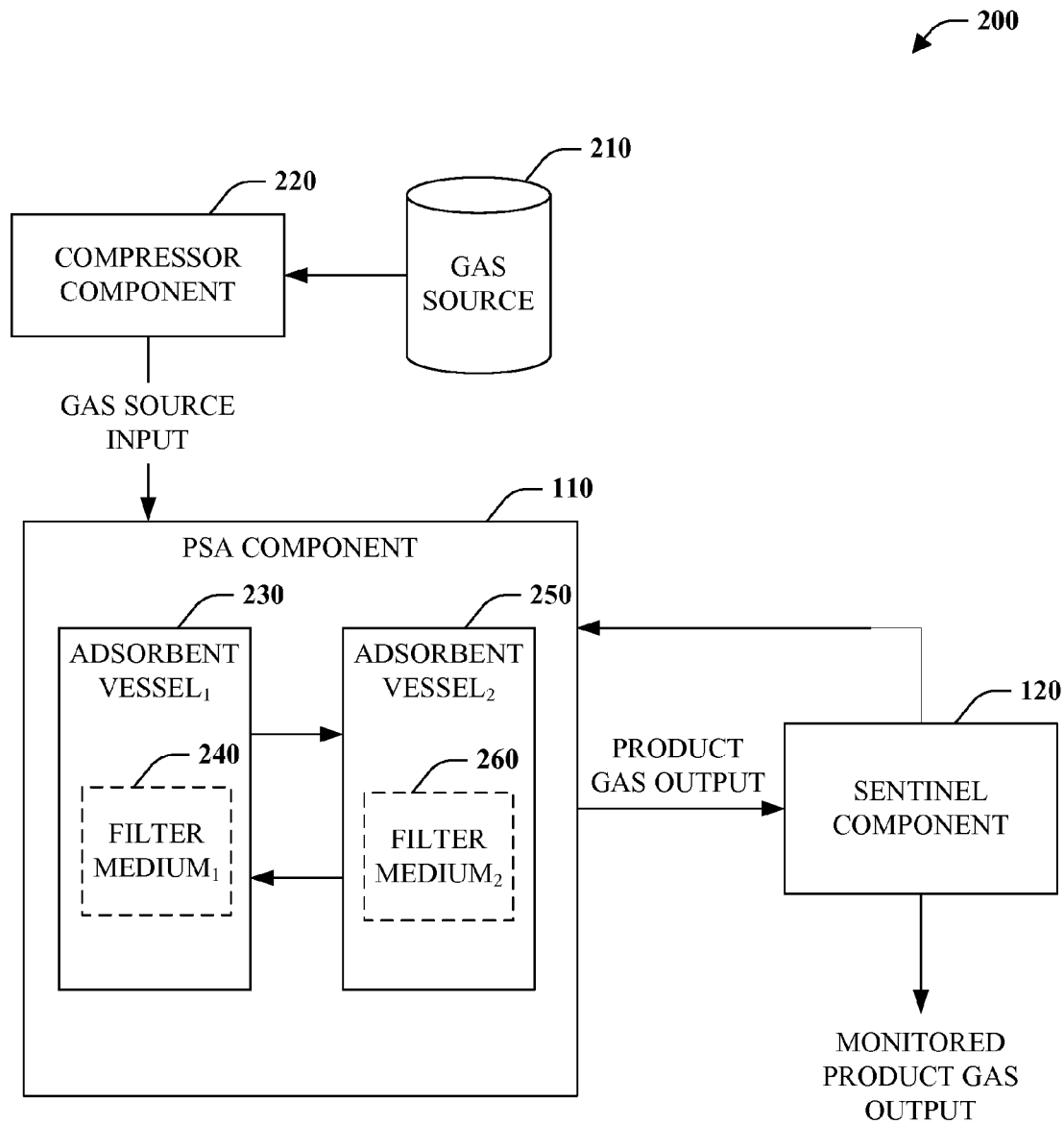
FIG. 2 is a block diagram of PSA system that facilitates real-time monitoring of a product gas output.

FIG. 2 illustrates a PSA system 200 that facilitates real-time monitoring of a product gas output. The PSA system 200 enables real-time dynamic detection of at least one parameter related to generating a purified gas output (also referred to as a product gas output) via Pressure Swing Adsorption. The PSA system 200 is an exemplary Pressure Swing Adsorption environment that filters gas particles to produce a purified gas output. However, it is to be appreciated that the PSA system 200 can include various valves, compressors, storage tank/vessel, reserve tanks/vessels, pipes, conduit, and the like but are not illustrated for the sake of brevity. Moreover, the PSA system 200 is illustrated as a dual (2) vessel environment, yet such dual vessel technique is not to be limiting on the subject innovation. Any suitable number of vessels can be employed in order to generate purified output gas via Pressure Swing Adsorption.

The PSA system 200 includes a compressor component 220 that compresses gas from a gas source 210 to the PSA component 110. In particular, the compressor component 220 can force the gas source input (e.g., from the gas source 210) into the PSA component 110. It is to be appreciated that the gas source can be any suitable gas utilized with Pressure Swing Adsorption such as, but not limited to, ambient air, a gas that includes Oxygen, a gas that includes Nitrogen, a gas that includes Carbon, a gas that includes Ammonia, a gas that includes Methane, a gas that includes Hydrogen, any suitable combination thereof, among others.

The PSA component 110 in the PSA system 200 is depicted as a dual vessel PSA environment that allows continuous production of a purified gas output. For instance, two vessels are utilized so that a portion of the purified gas output produced from a first vessel can regenerate the filter medium of a second vessel. The PSA component 110 includes a first adsorbent vessel 230 (e.g., also referred to as "adsorbent vessel$_1$"). The first adsorbent vessel 230 includes a first filter medium 240 (e.g., also referred to as "filter medium$_1$"). The PSA component 110 further includes a second adsorbent vessel 250 (e.g., also referred to as "adsorbent vessel$_2$") that utilizes a second filter medium 260 (e.g., also referred to as "filter medium$_2$"). As discussed above, a composition of the filter medium 240 and the filter medium 260 is selected based upon the target purified gas output that is to be generated via Pressure Swing Adsorption. By way of example and not limitation, the filter medium composition can be, but is not limited to, Zeolite, a Carbon Molecular Sieve, an activated Carbon, an alumina, a silica gel, and the like. This dual vessel environment produces a purified gas output (e.g., also referred to as product gas output) by filtering particles of the gas source input with the first filter medium 240 and the second filter medium 260.

The first filter medium 240 and the second filter medium 260 can discriminate between different gases based upon being very porous materials and having large surface areas. In general, filter mediums (e.g., first filter medium 240 and second filter medium 260) can adsorb gas on these surfaces that consist of a layer only one or at most a few molecules thick. Yet, surface areas of several hundred square meters per gram enable the adsorption of a significant portion of the filter medium's weight in gas. In addition to their selectivity for different gases, filter mediums such as Zeolites and some types of activated carbon called carbon molecular sieves may utilize their molecular sieve characteristics to exclude some gas molecules from their structure based on the size of the molecules, thereby restricting the ability of the larger molecules to be adsorbed. Therefore, it is to be appreciated that the first filter medium 240 and the second filter medium 260 can include any suitable adsorbent characteristic (e.g., attracting molecules, physical adsorption) or molecular sieve characteristic (e.g., restricting molecules based on size, Steric hindrance). For instance, the first filter medium 240 and the second filter medium 260 can be, but are not limited to being, a Zeolite, a Carbon Molecular Sieve, an activated Carbon, an alumina, a silica gel, among others.

Within the PSA system 200, the gas source input can be forced into the first adsorbent vessel 230 under pressure. This adsorbent vessel 230 (e.g., also referred to as a sieve bed), can be filled with the first filter medium 240 based upon the gas source input and/or the target purified gas output that is to be produced. The compressed gas source input is fed into the first adsorbent vessel 230, then the feed swings to pressurize the second adsorbent vessel 250. For the sake of brevity, Pressure Swing Adsorption will be described with the first adsorbent vessel 230 and the first filter medium 240. The pressurized, excited molecules move actively throughout and around the first filter medium 240. The first filter medium 240 can be porous such that the holes are of a size that filters particles of the gas source input allowing a first set of particles to be filtered (e.g., adsorbed) and a second set of particles to pass (e.g., de-adsorbed). After a set duration of time, the target purified gas output can be released out of the first adsorbent vessel 230.

Typically, the purified gas output is captured in a surge tank or a storage vessel. However, the purified gas output is transferred to the sentinel component 120 (discussed in more detail below). When the purified gas output is drawn out of the first adsorbent vessel 230, the pressure is released quickly, allowing the purified gas output to escape and "cleanse" the first filter medium 230 for the next cycle. The first adsorbent vessel 230 is then re-flooded with pressurized gas source input and the cycle beings again. It is to be appreciated that Pressure Swing Adsorption can be employed similarly with the second adsorbent vessel 250 and the second filter medium 260. Moreover, a portion of the purified gas output generated from the first adsorbent vessel 230 can be utilized to regenerate the second filter medium 260 of the second adsorbent vessel 250 and vice versa. It is to be appreciated that any cooperation and/or interaction between the first adsorbent vessel 230 (as well as the first filter medium 240) and the second adsorbent vessel 250 (as well as the second filter medium 260) is to be included and not limiting on the subject innovation.

The purified gas output produced by the PSA component 110 is directly fed and/or received by the sentinel component 120. The sentinel component 120 can be directly in-line with the PSA component 110 such that the purified gas output is passed and received in situ at the sentinel component 120. Thus, it is to be appreciated that the sentinel component 120 can be directly attached to the PSA component 110, incorporated into the PSA component 110, separate from the PSA component 110 but directly physically connected, and/or any suitable combination thereof. In other words, the sentinel component 120 receives the produced purified gas output from the PSA component 110 without disruption of the Pressure Swing Adsorption process or environment in order to aggregate accurate real-time measurements.

The sentinel component 120 collects real-time continuous measurements of at least one parameter associated with the PSA system 200. The sentinel component 120 further monitors and collects the real-time measurements of at least one parameter in situ (e.g., without disruption of the PSA system 200 and/or the production of the purified gas output). In addition, the sentinel component 120 controls and/or adjusts the PSA component 110 (e.g., the production process of the purified gas output) based at least in part upon the real-time measurements aggregated. In other words, the sentinel component 120 employs real-time data from the PSA component 110 and/or the purified gas output in which such real-time data collection is analyzed to dynamically control the PSA component 110 and, in turn, the produced purified gas output. For example, a real-time measurement of flow rate can be collected and analyzed such that if the flow rate is determined to exceed a threshold, the flow rate can be automatically adjusted in order to maintain integrity and health of the purified gas output as well as any equipment or components of the PSA system 200.

The PSA system 200 can be any suitable environment that employs Pressure Swing Adsorption to filter gas particles in order to generate a purified gas output. Generally, the subject innovation is to cover and include any suitable variations to the PSA system 200 such as filter medium composition, number of adsorbent vessels, number of compressors, number of valves, type of gas source, among others. Not only is the subject innovation intended to include any PSA technique that creates a purified gas output, the industry or purpose for the purified gas output is not to be limiting on the real-time collection and control of the PSA system 200.

For instance, the PSA system 200 can employ PSA to remove carbon dioxide ($CO_2$) in a large-scale commercial synthesis of Hydrogen. In one example, the PSA removal of Carbon Dioxide ($CO_2$) can implemented in oil refineries and in the production of ammonia ($NH_3$). Refineries often use PSA technology in the removal of hydrogen sulfide ($H_2S$) from hydrogen feed and recycle streams of hydrotreating and hydrocracking units. In another example, the PSA system 200 can separate carbon dioxide from biogas to increase the methane ($CH_4$) content. Through PSA the biogas can be upgraded to a quality similar to natural gas. In still another example, a Nitrogen generator unit can employ PSA to produce high purity nitrogen gas (99.5% or greater) from a supply of compressed air. The PSA system 200 can further capture $CO_2$ in large quantities from coal-fired power plants prior to geo-sequestration, in order to reduce greenhouse gas production from these plants. Similarly, the PSA system 200 can remove $CO_2$ from the flue streams of the steel and lime industries. As discussed above, the PSA system 200 can produce purified Oxygen or Nitrogen from ambient air. For instance, the PSA system 200 and PSA technology can be utilized in the medical industry to produce Oxygen, particularly in remote or inaccessible parts of the world where bulk cryogenic or compressed cylinder storage is not possible. In still another example, the PSA system 200 can be a more compact and a small system such as a primary life support system that produces purified Oxygen for breathable air for a space suit, space station, space craft, and the like.

Figure 3:
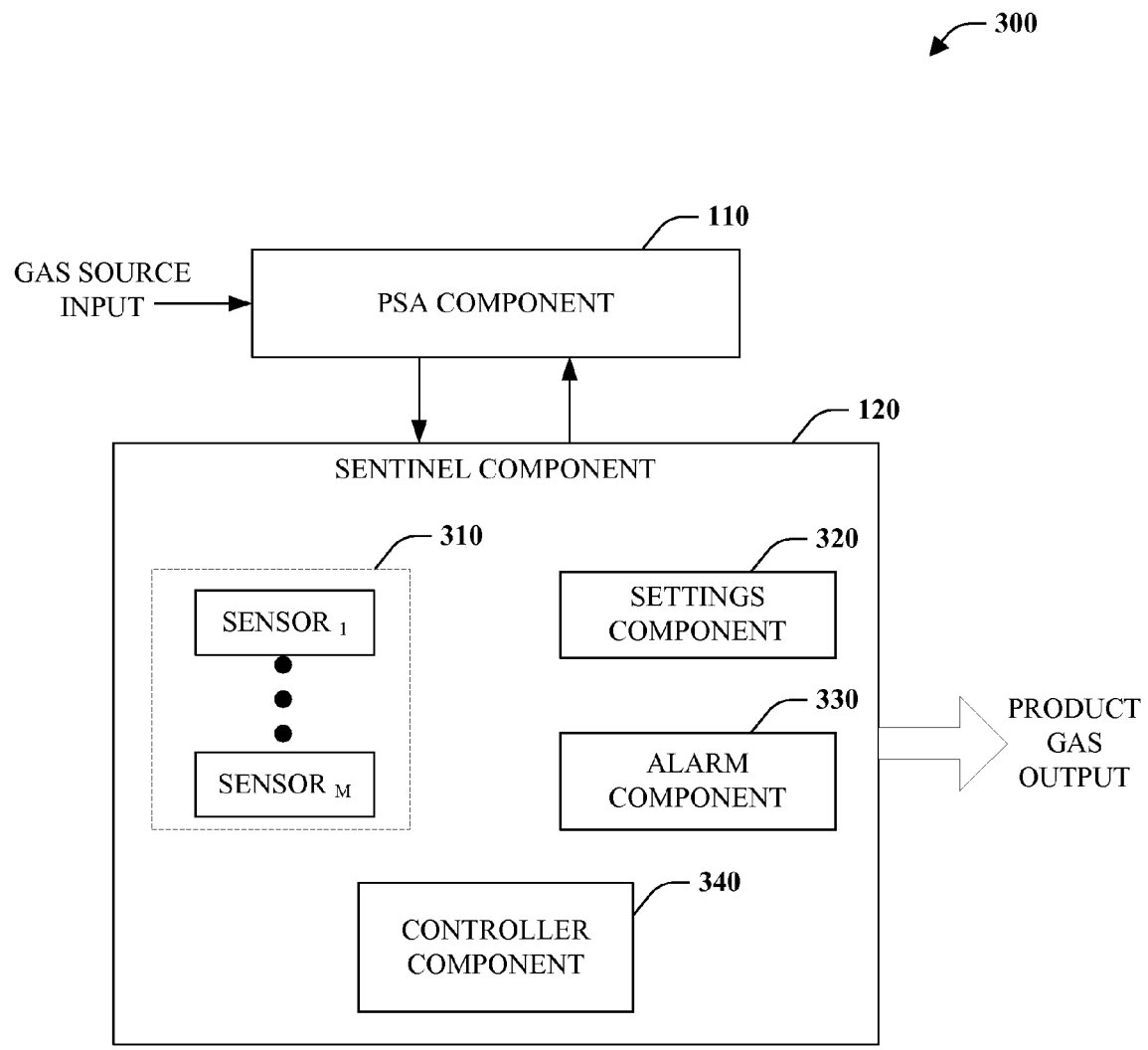
FIG. 3 is a block diagram of a system that facilitates controlling PSA based upon sensors that continuously aggregate data in real-time.

FIG. 3 illustrates a system 300 that facilitates controlling PSA based upon sensors that continuously aggregate data in real-time. The system 300 includes the PSA component 110 that is configured to filter a gas source input to generate a purified gas output utilizing a Pressure Swing Adsorption technique. The purified gas output that is created is directly fed into the sentinel component 120, wherein the sentinel component 120 employs real-time detection of at least one parameter and dynamic control of the PSA component 110 and, in turn, the production of the purified gas output. For instance, the sentinel component 120 monitors the purified gas output in situ and in real-time in which such real-time monitoring enables dynamic adjustment and control of the production of the purified gas output. In another instance, the sentinel component 120 provides real-time monitoring of the PSA component 110 and/or a component and/or equipment associated with Pressure Swing Adsorption. In other words, the sentinel component 120 employs real-time detection of at least one parameter associated with the purified gas output of the Pressure Swing Adsorption technique or the physical equipment/component(s) utilized in Pressure Swing Adsorption to generate the purified gas output.

The sentinel component 120 further includes at least one sensor 310 (also referred to as "the sensor 310") that monitors or tracks in real-time at least one parameter and/or condition associated with the purified gas output and/or the PSA component 110. It is to be appreciated that there can be any suitable number of sensors 310, such as sensor$_1$ to sensor$_M$, where M is a positive integer. The sensor 310 can be any suitable real-time sensor that provides real-time continuous collection of data related to at least one of the purified gas output generated by the PSA component 110 or a component/equipment associated with the generation of the purified gas output.

The following examples are intended for illustrative purposes and are not to be limiting on the subject innovation. For instance, the sensor 310 can detect a parameter associated with the purified gas such as, but not limited to, pressure (e.g., high pressure, low pressure, etc.), concentration for a particular gas (e.g., concentration of purified gas output, concentration of adsorbed gas, concentration of de-adsorbed gas, etc.), flow rate, temperature (e.g., temperature of purified gas output, temperature of adsorbed gas, temperature of de-adsorbed gas, etc.), moisture, dew point, among others. In another example, the sensor 310 can detect a parameter associated with the PSA component 110 and/or any suitable component/equipment incorporated therewith in order to generate the purified gas output. In this example, the sensor 310 can detect, but is not limited to detecting, debris count from a filter medium, duration of time producing a purified gas for a filter medium, a cracking of a filter medium, a crushing of a filter medium, a machine temperature, a machine age, among others.

The sentinel component 120 includes a settings component 320 that manages a threshold value for each real-time monitored parameter, wherein there can be any suitable number of real-time monitored parameters with a corresponding threshold value. The settings component 320 can include a threshold value that is customized for the particular PSA component 110 and/or a specific Pressure Swing Adsorption environment. For instance, based on factors such as, but not limited to, PSA target purified gas output, adsorbent vessel size, gas source input, purified gas output amount, among others; the settings component 320 can include various settings for each threshold value for each real-time monitored parameter. As an example, a first PSA environment can include a first pressure threshold value based on specific characteristics associated therewith and a second PSA environment can include a second pressure threshold value based on particular characteristics associated with the second PSA environment. In other words, the settings component 320 can include at least one threshold value (e.g., tolerance value, etc.) that is specific to the particular PSA environment and/or each PSA component 110.

The settings component 320 can further dynamically adjust the threshold value for each real-time parameter based upon the real-time monitoring of the parameter. In other words, a first threshold value can be set and re-set based upon analysis of the parameter collected in real-time. For instance, a first flow rate threshold value can be set but based upon real-time tracking the threshold value may be either rarely exceeded or rarely met. In such case, the flow rate threshold value can be re-adjusted based upon the real-time data collection of the flow rate. Moreover, the settings component 320 can leverage historic data in order to set a threshold value for a specific parameter that is measured in real-time. For instance, based on real-time collected concentration values for a time frame, the threshold value for concentration can be re-evaluated and/or re-established. Additionally, the settings component 320 can include a threshold value that is pre-set manually, pre-set automatically, re-set manually, re-set automatically, and/or any suitable combination thereof.

The sentinel component 120 further includes an alarm component 330 that communicates a notification based at least in part upon a comparison of a real-time monitored parameter with a threshold value for such parameter. In particular, if a real-time parameter is above or below a set threshold value, the alarm component 330 can communicate a notification indicating such. For instance, the notification can be in a digital format, an audible format, a visual format, and/or any suitable combination thereof. Furthermore, the alarm component 330 can trigger an alarm notification with varying degrees in which a particular degree can be associated with a level of importance. For instance, the level of importance for an alarm notification can correspond to an amount a set threshold value is exceeded with the comparison of the real-time parameter with the set threshold value. In other words, the more a threshold value is exceeded, the more critical and important the alarm notification. For instance, the alarm notification can be an audible alarm, a visual alarm on a display, a physical alarm (e.g., vibration notification, an alarm that includes movement, etc.), and the like.

The sentinel component 120 further includes a controller component 340 that manages Pressure Swing Adsorption via the PSA component 110 based at least in part upon the real-time collected data from the at least one sensor 310. In general, the real-time data collected via the sensor 310 can be analyzed in which such analysis enables the controller component 340 to adjust the PSA component 110 and/or equipment/component(s) associated with the Pressure Swing Adsorption technique. For instance, the analysis can be a comparison of the real-time data collected for a parameter with a threshold value for such parameter.

The controller component 340 can manage the PSA component 110 and, in turn, the production of the purified gas output in order to optimize Pressure Swing Adsorption in a dynamic, continuous, and real-time manner. Based on the received real-time parameter from the sensor 310, the controller component 340 can adjust a setting and/or condition related to the PSA component 110 such as, but not limited to, a pressure, a flow rate, a concentration of a gas, a temperature, a dew point, a moisture level, among others. Moreover, the controller component 340 can manage an activation or a de-activation of a portion of the PSA component 110 and/or the PSA environment (not shown, but refer to FIG. 2). In other words, the controller component 340 can implement a startup, a shutdown, a delay, an idle state, and the like based upon the evaluation of the real-time parameter collected via the sensor 310.

For example, a power supply can be de-activated for at least a portion of the PSA component 110 and/or the PSA environment. Additionally, the power supply for a down-the-line component that utilizes the purified gas output can be de-activated. In a particular example, a compressor that forces a gas input into an adsorbent vessel within a PSA environment can be de-activated based upon a real-time value that is outside a threshold value limit. Furthermore, the controller component 340 can receive any suitable alarm or notification that indicates a startup, a shutdown, or halt/delay is to be employed. For example, based on a received alarm notification (via the alarm component 330), a user can determine that a shutdown and/or de-activation of the PSA component 110 is recommended. Moreover, the controller component 340 can receive any suitable manual command/control. For instance, a user can employ a manual override of a portion of the PSA component 110 based at least in part upon the real-time detected parameters via the sensor 310.

What follows is a Pressure Swing Adsorption scenario with real-time parameters and controlling situations associated with aspects of the subject disclosure as provided with dynamically controlling a PSA environment. Such real-time monitored parameters, threshold values, and dynamic adjustments/controls are merely exemplary and provided to depict at least one embodiment of aspects of the disclosure. Of course, the subject disclosure is not intended to be limited to the type of PSA environment, the real-time monitored parameters, the threshold values, and/or the dynamic adjustments and all the real-time monitored parameters, the threshold values, and/or the dynamic adjustments that can achieve the same or similar result are included within this subject disclosure.

For example, a PSA environment can filter Nitrogen particles and Oxygen particles from ambient air to produce purified Oxygen. As discussed, at least one parameter can be monitored in real-time such as, but not limited to, pressure, purified gas output concentration (in this example, Oxygen), flow rate, debris count for a filter medium, moisture, dew point, etc. Each real-time parameter can include a respective value or range of values (e.g., threshold values) that are suitable for the production of purified Oxygen. Following this example, a pressure threshold value range can be 2 to 101 PSIG; a flow rate threshold value can be 0 to 2500 standard cubic feet per hour (SCFH) or a range that is within a percentage of a maximum allowable flow rate of the PSA environment; a purified Oxygen concentration threshold value can be 0 to 100%, wherein the percentage is set based on the target quality for the PSA environment; and a debris count for the filter medium can be 0 to 1000 particles per cubic foot ($P/F^3$). It is to be appreciated that the ranges above can be any suitable range tailored for a particular PSA environment and the above are illustrated as examples that are not to be limiting on the subject disclosure. In terms of dynamic control, the PSA environment can be controlled based upon the real-time detected parameter that is outside the bounds of a respective threshold value. For instance, if a pressure threshold value is exceeded or not reached, an alarm can be communicated and an external output relay(s) can disable at least one of downstream equipment (e.g., down-the-line equipment/component(s)), the PSA component 110, among others. In addition, if the pressure threshold value is exceeded or not reached, a control system can be notified (e.g., alarm notification, etc.). In another example, if a flow rate threshold value is exceeded or not reached, an alarm can be communicated and an external output relay(s) can disable at least one of downstream equipment (e.g., down-the-line equipment/component(s)), the PSA component 110, among others. In addition, if the pressure threshold value is exceeded or not reached, a control system can be notified (e.g., alarm notification, etc.). In still another example, if the purified Oxygen concentration threshold value is exceeded or not reached, an alarm can be communicated and an external output relay(s) can disable at least one of downstream equipment (e.g., down-the-line equipment/component(s)), the PSA component 110, among others. In addition, if the pressure threshold value is exceeded or not reached, a control system can be notified (e.g., alarm notification, etc.). In yet another example, if a debris count for the filter medium is exceeded, an alarm can be communicated and an external output relay(s) can disable at least one of downstream equipment (e.g., down-the-line equipment/component(s)), the PSA component 110, among others. In addition, if the pressure threshold value is exceeded or not reached, a control system can be notified (e.g., alarm notification, etc.). Further as discussed above, an alarm notification can be triggered based upon a real-time parameter exceeding or not meeting the threshold value as well as the real-time parameter approaching the threshold value (e.g., being within a specified percentage or range of the threshold value).

Figure 4:
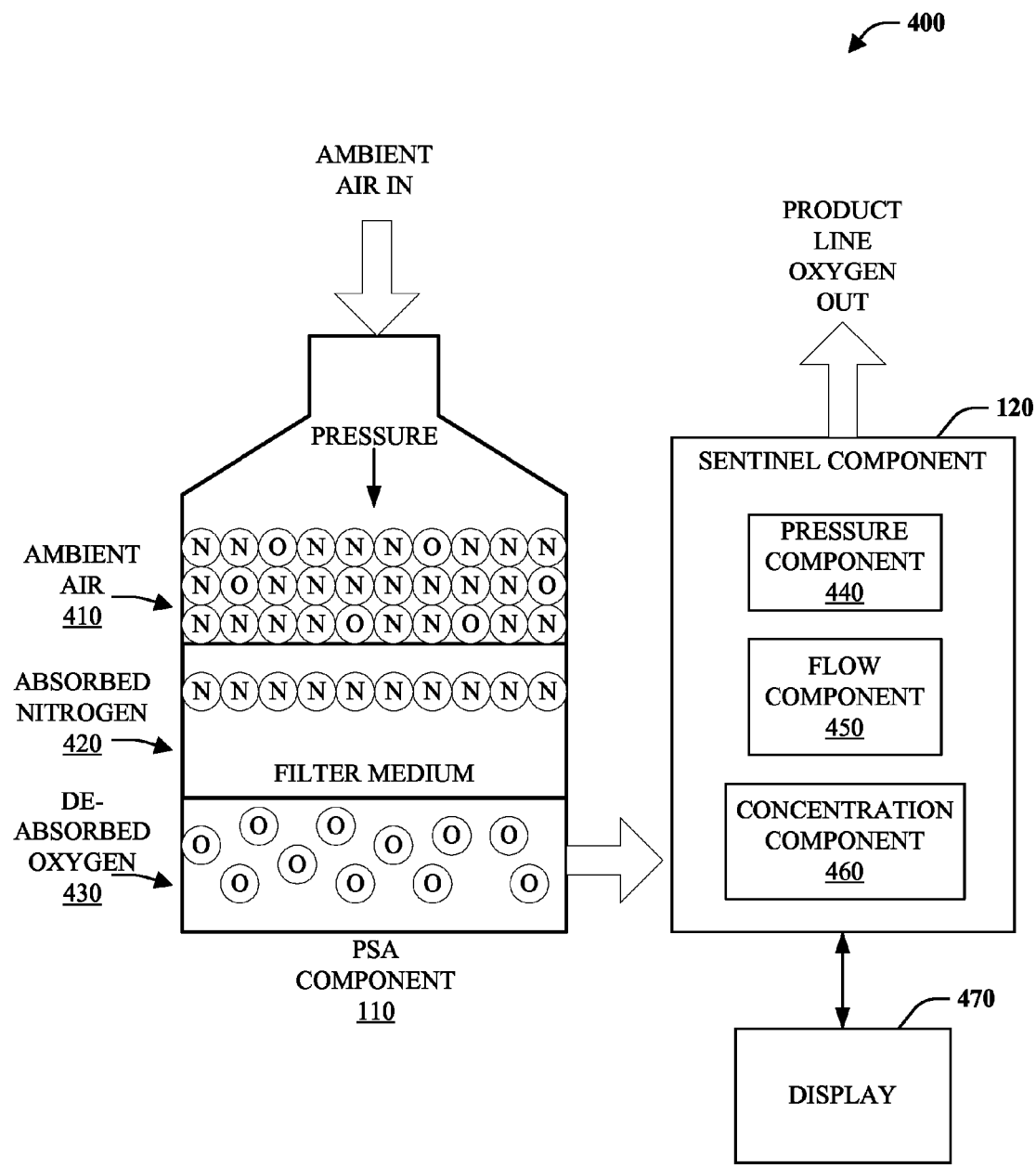
FIG. 4 is a block diagram of an ambient air PSA system that facilitates in situ monitoring of product line output based upon aggregated real-time measurements.

FIG. 4 illustrates an ambient air PSA system 400 that facilitates in situ monitoring of product line output based upon aggregated real-time measurements. The ambient air PSA system 400 leverages Pressure Swing Adsorption to filter Nitrogen particles and Oxygen particles from ambient air 410 in order to generate a purified Oxygen gas (e.g., purified output gas). The ambient air PSA system 400 includes the PSA component 110. For the sake of brevity, the PSA component 110 is illustrated with a single adsorbent vessel. It is to be appreciated that the PSA component 110 can be a dual vessel PSA environment, as well as can include any suitable valves, compressors, and the like. Moreover, the subject innovation is not to be limited to an ambient air PSA filtration system and any PSA filtration system that separates particles is to be included within the scope of the subject disclosure.

The PSA component 110 can receive ambient air 410 from a gas source input (not shown), wherein the ambient air 410 is pressurized. For instance, the ambient air can be comprised of at least Nitrogen, Oxygen, among others. The PSA component 110 can further include a filter medium that includes a composition that adsorbs Nitrogen (e.g., adsorbed Nitrogen 420) and de-adsorbs Oxygen. In other words, the filter medium captures the Nitrogen particles and allows the Oxygen particles to pass-through the filter medium. The particles that are passed-through or de-adsorbed are a purified Oxygen gas, also referred to as de-adsorbed Oxygen 430.

The de-adsorbed Oxygen 430 is directly transferred to the sentinel component 120. The sentinel component 120 employs real-time adjustment of the PSA component 110 based at least in part upon real-time in situ monitoring of a parameter associated with the PSA component 110. Thus, the sentinel component 120 optimizes Pressure Swing Adsorption to produce a real-time monitored and dynamically controlled product line Oxygen output (e.g., also referred to as product line Oxygen out). In particular, the sentinel component 120 tracks at least one parameter in real-time, wherein the parameter can be, but is not limited to being, a pressure, a flow rate, or a concentration (e.g., purity). Furthermore, the sentinel component 120 controls the PSA component 110 based upon the real-time detected parameter(s) in order to ensure the integrity of the purified Oxygen gas output generated as well as at least a portion of the PSA component 110 (e.g., component/equipment associated with the PSA component 110 to create a purified gas output).

The sentinel component 120 includes a pressure component 440 that tracks a pressure parameter in real-time and in situ (e.g., without disturbing the production of the purified Oxygen output). For instance, a pressure value can be collected in real-time, wherein the pressure value corresponds to the pressure of the purified Oxygen gas output produced by the PSA component 110. Based on the real-time collection of the pressure value, the sentinel component 120 can adjust the PSA component 110 in order to ensure integrity of the produced purified Oxygen gas output as well as the PSA component 110 (including the filter medium, components/equipment incorporated with the PSA component 110, as well as down-the-line equipment that utilizes the purified Oxygen gas output (not shown)). It is to be appreciated that the pressure component 440 can be any suitable pressure sensor that collects pressure data in real-time and in situ.

The sentinel component 120 further includes a flow component 450 that collects real-time data in situ for a flow rate. For example, the flow component 450 can determine the flow rate of the purified Oxygen gas output based upon collecting data in real-time before and after such purified Oxygen gas output passes through an orifice. It is to be appreciated that the orifice can be any suitable size and the orifice can be specific to the Pressure Swing Adsorption environment and/or the PSA component 110. Moreover, it is to be appreciated that the flow component 450 can utilize any suitable technique in order to detect a real-time value for the flow rate. Based on the real-time collection of the flow rate, the sentinel component 120 can adjust the PSA component 110 in order to ensure integrity of the produced purified Oxygen gas output as well as the health of the PSA component 110 and/or down-the-line equipment/component(s).

Furthermore, the sentinel component 120 includes a concentration component 460 that tracks a purity (e.g., concentration) level of the purified Oxygen gas output in real-time. For instance, the purified Oxygen gas output purity can indicate whether the product line output is of a required quality. It is to be appreciated that any suitable sensor that detects concentration level or purity level in real-time can be employed by the concentration component 460. Based on the real-time collection of the purity level, the sentinel component 120 can adjust the PSA component 110 in order to ensure integrity of the produced purified Oxygen gas output as well as the health of the PSA component 110 and/or down-the-line equipment/component(s).

The ambient air PSA system 400 further includes a display component 470 that is configured to display any data associated with the system 400. For example, the display component 470 can display, but is not limited to displaying, real-time collected data (e.g., pressure parameter, flow rate, concentration level, etc.), a threshold value for a real-time monitored parameter, an alarm notification based upon analysis of the real-time collected parameter(s), source gas input data, purified gas output data (e.g., amount produced, etc.), filter medium data, PSA component information (e.g., type of equipment, type of filter medium, target purified gas output, adsorbed particles, de-adsorbed particles, etc.), and the like. In general, the display component 470 can display any suitable data associated with the system 400. For instance, the display component 470 can be a monitor, a television, a Liquid Crystal Display (LCD), a computer monitor, a plasma screen, a tablet, a laptop, a CRT monitor, a Human Machine Interface (HMI), among others.

Figure 5:
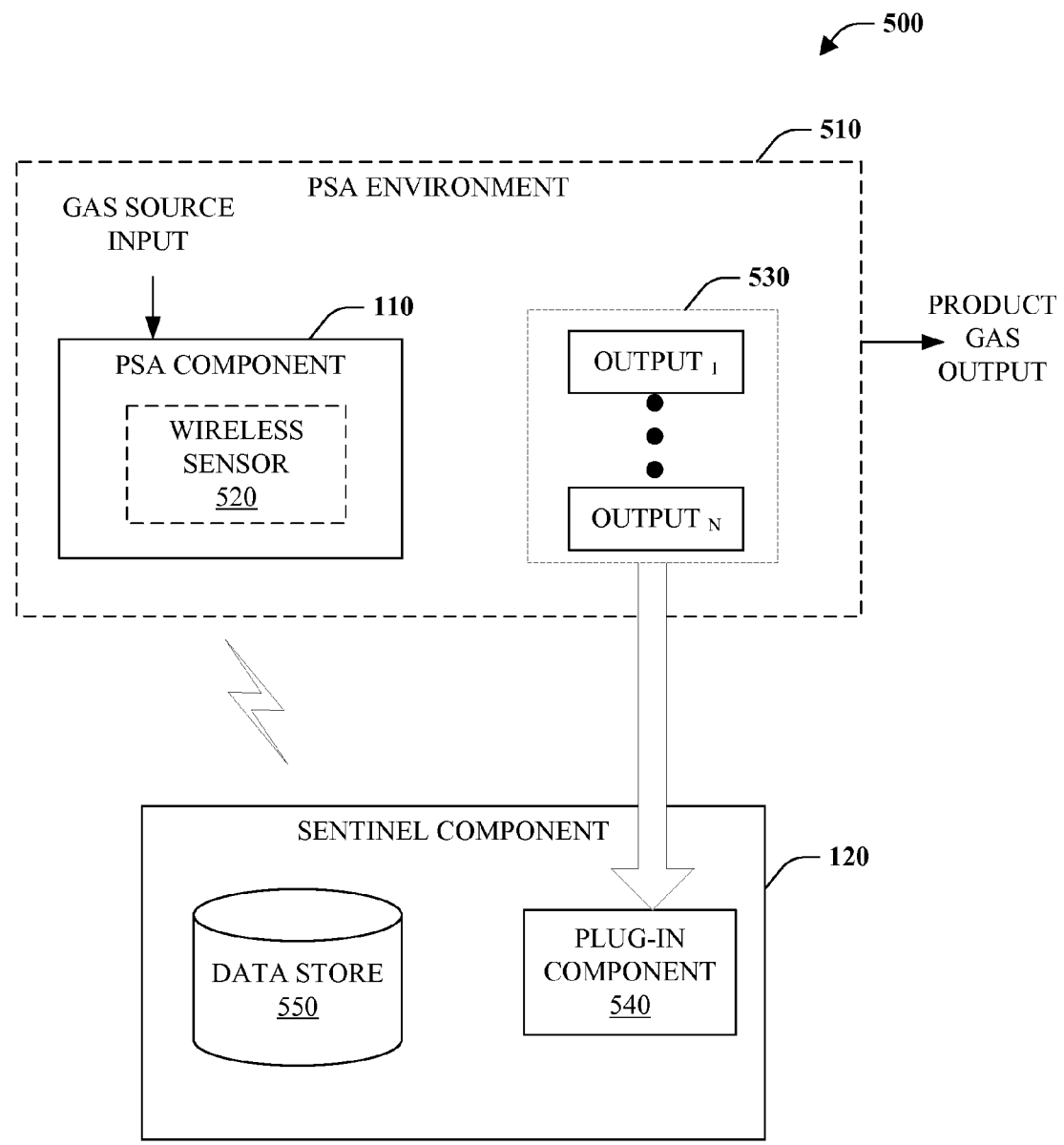
FIG. 5 is a block diagram of a system that facilitates collecting sensor data from a PSA environment for dynamic control.

FIG. 5 illustrates a system 500 that facilitates collecting sensor data from a PSA environment for dynamic control. The system 500 includes a PSA environment 510 that utilizes Pressure Swing Adsorption to filter gas particles with a filter medium in order to generate a purified gas output (e.g., also referred to as a product gas output). As discussed, the PSA environment 510 can include any suitable components, equipment, valves, vessels, filter mediums, etc. but are not depicted for the sake of brevity.

The PSA environment 510 includes the PSA component 110 that receives a gas source input that can be filtered to separate a first set of particles and a second set of particles to produce a purified set of particles (e.g., purified gas output). The PSA environment 510 further includes the sentinel component 120 that dynamically controls the PSA environment 510 based upon a real-time data collection of at least one parameter in order to maintain quality assurance for the produced purified gas output.

The sentinel component 120 can leverage at least one wireless sensor 520 in order to collect real-time data associated with a parameter. For instance, the wireless sensor 520 can provide wireless, real-time, in situ monitoring for pressure, flow rate, purity and/or concentration, debris count for a filter medium, among others. Based at least in part upon the real-time aggregated data, the sentinel component 120 can adjust the PSA environment 510. As depicted, the sentinel component 120 can receive the real-time parameter(s) wirelessly and adjust the PSA environment 510 wirelessly.

The PSA environment 510 can include at least one output 530 that corresponds to a measurable condition associated with the production of the purified gas output. For instance, there can be any suitable number of outputs, such as $output_1$ to $output_N$, where N is a positive integer. The output 530 can be utilized by a plug-in component 540 in order to incorporate additional parameters that may affect the PSA environment 510 and/or the production of the purified gas output. The output can be a measureable condition related to, for example, a valve, an adsorbent vessel, a surge tank, a compressor, an air drier, a buffer tank, the wireless sensor 520, etc. Based on this additional parameter, the measurable condition can be included in the adjustment of the PSA environment 510 via the plug-in component 540 and/or the sentinel component 120. By way of example, a valve can be monitored and incorporated into the control provided by the sentinel component 120. The plug-in component 540 can receive a signal from the valve (e.g., an output that corresponds to a measurable condition) and convert such signal into a parameter to which the sentinel component 120 utilizes to adjust the PSA environment 510. Following such example, if the valve fails, the sentinel component 120 can suspend or de-activate at least a portion of the PSA environment 510 (e.g., de-activate a portion of equipment located after the valve in order to ensure integrity of the system 500).

The system 500 further includes a data store 550. The data store 550 can include any suitable data related to the PSA environment 510, the PSA component 110, the sentinel component 120, the wireless sensor 520, the output 530, the plug-in component 540, etc. For example, the data store 550 can store data such as, but not limited to, real-time parameter value(s) (e.g., a pressure value, a flow rate, a concentration value, a debris count, etc.), a time stamp of collected real-time parameter(s), a threshold value for a particular parameter (e.g., pressure threshold value, flow rate threshold value, concentration threshold value, debris count threshold value, etc.), filter medium life, data associated with the gas source input, data related to the purified gas output, alarm(s) triggered, alarm notification(s), timestamp data for an alarm notification, settings data (e.g., data for the settings component in FIG. 3), alarm settings, and the like.

Figure 6:
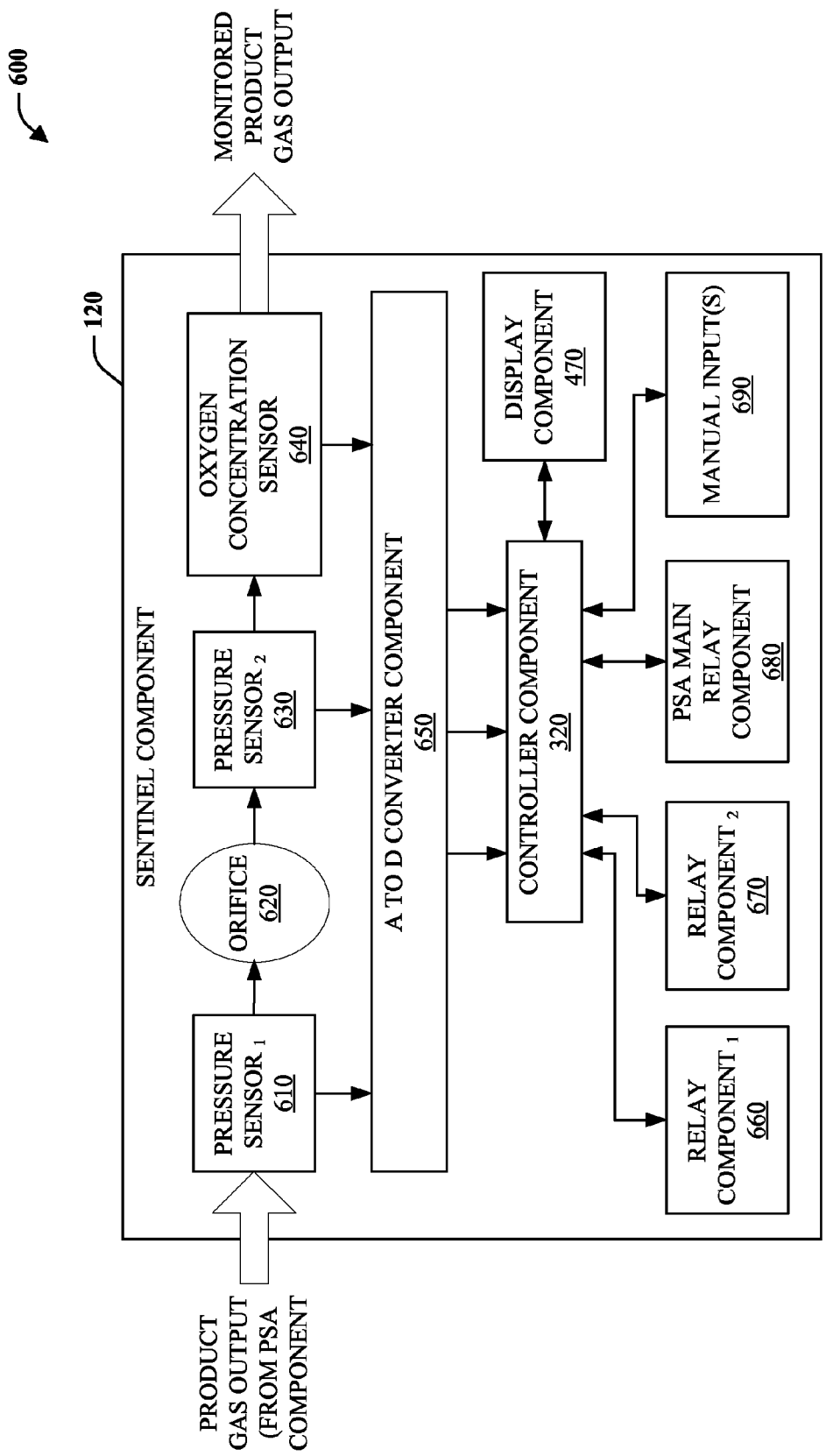
FIG. 6 is a block diagram of a system that facilitates in situ and real-time monitoring of a product gas output associated with PSA.

It is to be appreciated that the data store 550 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 550 of the subject systems and methods is intended to comprise, without being limited to, these and any other suitable types of memory. In addition, it is to be appreciated that the data store 550 can be a server, a database, a hard drive, a pen drive, an external hard drive, a portable hard drive, a cloud-based storage, and the like FIG. 6 illustrates a system 600 that facilitates in situ and real-time monitoring of a product gas output associated with PSA. The system 600 includes the sentinel component 120. The sentinel component 120 provides dynamic and continuous control of Pressure Swing Adsorption based upon a real-time collected parameter as discussed above.

The sentinel component 120 includes a first pressure sensor 610 (also referred to as pressure sensor$_1$), wherein the first pressure sensor 610 can collect a real-time high pressure parameter associated with a product gas output (e.g., also referred to as a purified product gas output). The product gas output can be generated from a PSA component (not shown) as discussed above. The product gas output can flow to an orifice 620 (e.g., differential pressure orifice) and to a second pressure sensor 630 (also referred to as pressure sensor$_2$). The second pressure sensor 630 can be, for example, a low pressure sensor that collects a low pressure parameter in real-time. The product gas output can further flow to an Oxygen concentration sensor 640, wherein the Oxygen concentration sensor 640 monitors an Oxygen purity parameter for the product gas output in real-time. The product gas output can further flow down-the-line and be utilized, wherein the sentinel component 120 outputs a monitored product gas output (e.g., monitored in real-time).

The sentinel component 120 can further include an A to D converter component 650 that is an analog-to-digital converter for the real-time data collected. In particular, the A to D converter component 650 can convert an analog signal from at least one of the first pressure sensor 610, the second pressure sensor 630, or the Oxygen concentration sensor 640. The A to D converter component 650 can convert the analog signal to a digital signal for input to the controller component 320. By way of example, the A to D converter component 650 can be a serial 8 bit analog-to-digital converter. The sentinel component 120 can further include the display component 470 that displays data. It is to be appreciated that the display component 470 can be incorporated into the sentinel component 120 (as depicted), a separate component, and/or any suitable combination thereof.

The sentinel component 120 can further include a first relay component 660 (also referred to as relay component$_1$) that can be an external interlock relay. The sentinel component 120 can also include a second relay component 670 (also referred to as relay component$_2$) that can be an external interlock relay. For example, the first relay component 660 and the second relay component 670 can be either normally open or normally closed. The sentinel component 120 can further include a PSA component main relay component 680 (also referred to as a PSA main relay component). In particular, the PSA component main relay component 680 can be a solid state relay that provides a power supply to the PSA component (not shown). The sentinel component 120 also can include at least one manual input 690. For instance, the manual input 690 can be a potentiometer (POT). By way of example, the system 600 can include a first manual input that is a POT for a high flow threshold value (e.g., alarm trigger) and a second manual input that is a POT for a low concentration threshold value (e.g., alarm trigger). In another example, the manual input 690 can be a momentary push button (discussed below).

As discussed above, PSA Oxygen generators typically operate in an uncontrolled state relying on frequent operator supervision to ensure proper long term operation. The PSA component employs a molecular sieve (e.g., a filter medium) to adsorb Nitrogen gas from ambient air and deliver the remaining Oxygen as a product with concentrations around 90-97%. Typically, there can be two sieve beds that are fed by a compressor through series of valves that are timed. There can be pre-calculated intervals for the beds to be cycled and blown down or purged to evacuate the sieve beds of the adsorbed Nitrogen. It is assumed that the gas product ($O_2$) flow rate from the PSA component is regulated and would not exceed a maximum capacity of the sieve to adsorb the Nitrogen. If the product flow rate exceeds an equipment rating for any period of time, the sieve will over saturate and physically "crack" or "crush" resulting in a loss of adsorption efficiency. This will cause a drop in Oxygen product concentration as well as an increase in the gas dew point at concentrations below 40% or so.

The sentinel component 120 monitors the product gas flow rate, pressure, and $O_2$ concentration and can leverage the display component 470 to display these parameters. If any of the process variables fall outside of pre-programmed set points, the sentinel component 120 will display the fault and, for example, disable a main power supply to the PSA component. There are a set of "dry contacts" available in the Sentinel monitor to use for external fault indication to a Supervisory Control and Data Acquisition (SCADA) system (e.g., PSA environment) or to use as a safety shut down to equipment supplied by the PSA component. Furthermore, at least one analog output signal can be incorporated into the sentinel component 120, wherein the analog output signal (e.g., 4 to 20 mA or 0 to 5 vdc or 0 to 10 vdc) can be proportional to each measured parameter for the SCADA system (e.g., PSA environment, PSA component 110) for analysis. Thus, there can be "output channels" that include, for example, an $O_2$ concentration of 0 to 100% (e.g., 4 to 20 mA), and a flow rate of 0 to 1500 SCFH (e.g., 4 to 20 mA), and so on and so forth for each measured parameter.

The following is an example of the sentinel component 120 and execution within a PSA environment. The following example is solely for illustrative purposes and not to be limiting on the subject disclosure. A main power connector for the PSA component can be supplied by the sentinel component 120. The $O_2$ outlet from the PSA component can be connected to the sentinel component 120 and the product gas outlet will be delivered by the sentinel component 120. The ON/OFF switch on the PSA component can be left in the ON position. Power can be supplied to the sentinel component 120. When $O_2$ production is desired, the ON/OFF switch on the sentinel component 120 can be switched on. The microprocessor (e.g., controller component 320) in the sentinel component 120 can close a solid state relay (e.g., PSA component main relay component 680) which supplies 120 AC volts to the PSA component. It is to be appreciated that, based on the size of a PSA component or PSA environment, a higher or lower VAC may be required. For example, a larger PSA component may require a 230 VAC input as well or even a 480 VAC input. In this example, a 230 VAC SS relay can be utilized. In another instance, an external multi pole contact or motor control relay with an onboard output relay. In addition, a "remote enable/disable" input can be utilized with the sentinel component 120 that controls the PSA component. A compressor for the PSA component can energize and PSA can begin producing a purified gas output. There can be a short time delay (e.g., this short time delay can be adjustable) in the fault monitoring of the sentinel component 120 to allow for stabilization of Pressure Swing Adsorption.

As Oxygen enters the sentinel component 120, it passes an oxygen concentration sensor cell (e.g., Oxygen concentration sensor 640), the P1 pressure sensor (e.g., the first pressure sensor 610), the orifice 620, the P2 pressure sensor (e.g., the second pressure sensor 630), and the oxygen product outlet bulkhead. It is to be appreciated that a larger PSA component can include an external "orifice flow tube" that can provide a line-in to the sentinel component 120 since an output from a larger PSA component may be too large to fit inside the sentinel component 120. The Oxygen concentration sensor 640 can measure the gas concentration (e.g., 0-100% $O_2$) and supplies a 0-5 VDC signal that is proportional to the gas concentration to the controller component 320 (e.g., microcontroller). The first pressure sensor 610 and the second pressure sensor 630 can supply a similar 0-5 VDC signal to the controller component 320 proportional to pressure (e.g., 2-101 PSIG). As the gas flow through the sentinel component 120 increases, there can be an increase in differential pressure that is measured by the controller component 320.

Formulas can be used in the controller component 320 to calculate the gas flow rate in, for instance, standard cubic feet per hour (SCFH). The second pressure sensor 630 can also provide a product gas delivery pressure which is displayed. The sentinel component 120 can include, for example, a first 10K ohm potentiometer and a second 10K ohm potentiometer. The first and second 10K ohm potentiometers can be running an RCTIME loop with the controller component 320 (e.g., microcontroller) to develop a timing variable to allow for adjustments on a first alarm set point for "LOW O2 CONCENTRATION SHUTDOWN ALARM" and a second alarm set point for "HIGH GAS FLOW SHUTDOWN ALARM." These can be adjusted manually for flexibility and specific site/environment requirements. There can be a momentary pushbutton to put the controller component 320 into an "alarm set point mode" where the user defined alarm set points can be displayed for adjustment via the first and second 10K ohm potentiometers. It is to be appreciated that any process variables can be displayed on the display component 470 as well as any warnings for a duration of time prior to the sentinel component 120 disabling the PSA component by energizing the first relay component 660 and the second relay component 670.

The following is an example of the sentinel component 120 and execution within a PSA environment. The following example is solely for illustrative purposes and not to be limiting on the subject disclosure. A paramagnetic oxygen sensor cell can be utilized in the purified gas output line from the PSA component. This signal from the sensor can be preconditioned by electronics included in the sensor package. A 0 to 5 VDC signal that is proportional to the $O_2$ concentration can be transmitted from the sensor to an 8 bit ADC (analog to digital converter) for translating the variable voltage signal into a digital signal that the controller component (not shown) (e.g., microprocessor, etc.) can interpret. The formula used by the sentinel component 120 is as follows:

RESULT from ADC=255@5 VDC or 100% O2

O2concentration=O2result/*100 or (255/100*256) to equal 100.329% O2.

It is to be appreciated that this data with the sentinel component 120 for alarming and other formulae.

The following is an example of the sentinel component 120 and execution within a PSA environment. The following example is solely for illustrative purposes and not to be limiting on the subject disclosure. Two strain gauge pressure sensors can be to measure a pressure differential across a metering orifice. The voltage provided by the pressure sensors can be proportional to the line pressure 0 to 111 psi=0 to 5VDC. Each pressure sensor can provide a variable voltage signal to an 8 bit ADC in a similar manner to the $O_2$ sensor discussed above. The data from the ADC is scaled and used in the controller component (not shown) (e.g., microprocessor, etc.) as follows:

PRESS=((*P*result−9)*/120) or ((255−9)/120*256))= 111.47 psi.

It is to be appreciated that this data with the sentinel component 120 for alarming and other formulae.

It is to be appreciated that flow can be measured by gathering real-time (e.g., live) test data and developing formulae to fit an individual application (e.g., particular PSA component, specific PSA environment, etc.). Typically the differential pressure can be multiplied by an inlet pressure and divided by a constant. This method is not accurate over the full gas flow range but is designed to function within a performance window of the PSA component to indicate when the gas flow is exceeding the maximum rating.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the sentinel component 120 or one or more sub-components thereof can employ such mechanisms to efficiently determine or otherwise infer detrimental condition(s) or scenario(s) that lead to damaging equipment utilized with PSA. In particular, real-time data collection for parameters associated with PSA can be analyzed in conjunction with historical data in which such mechanisms can efficiently infer hazardous PSA environment condition(s) that may lead to damaged or destroyed equipment (e.g., compressor, filter medium, adsorbent vessel, valves, etc.).

Figure 7:
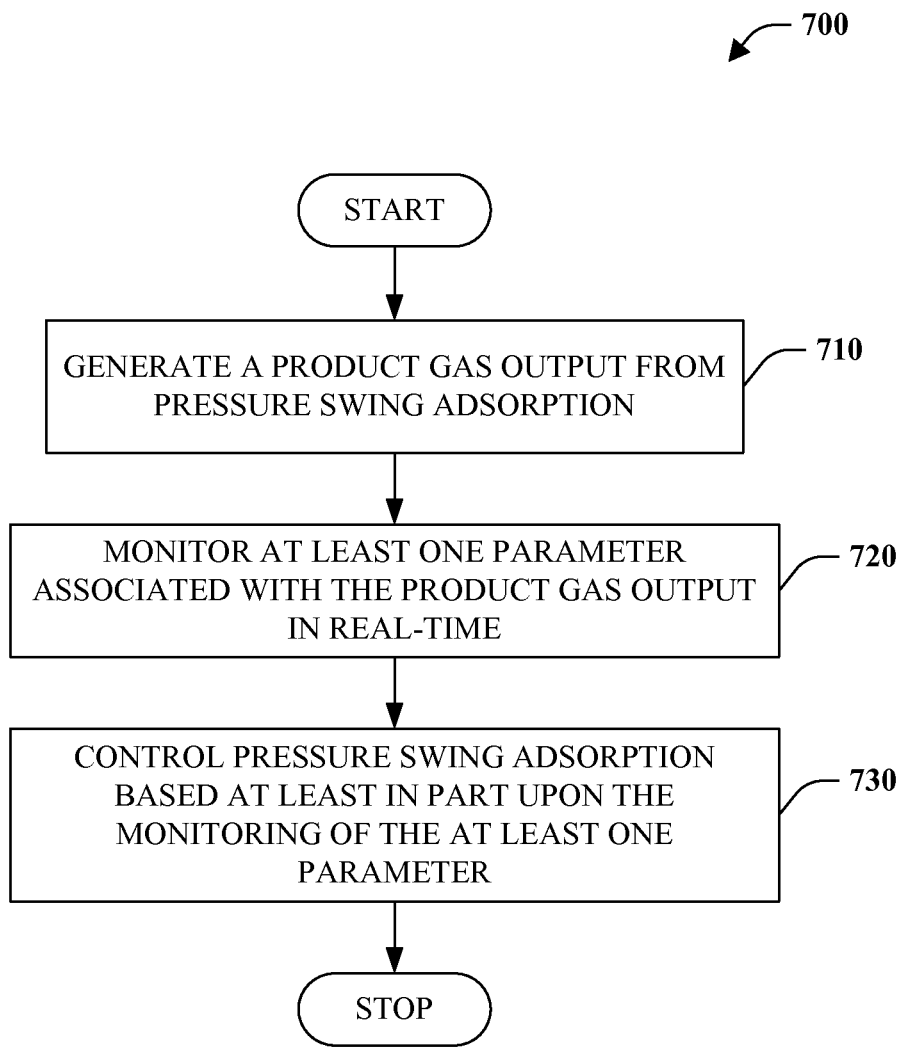
FIG. 7 is a flow chart diagram of a method of controlling Pressure Swing Adsorption based upon a real-time monitored parameter.
Figure 8:
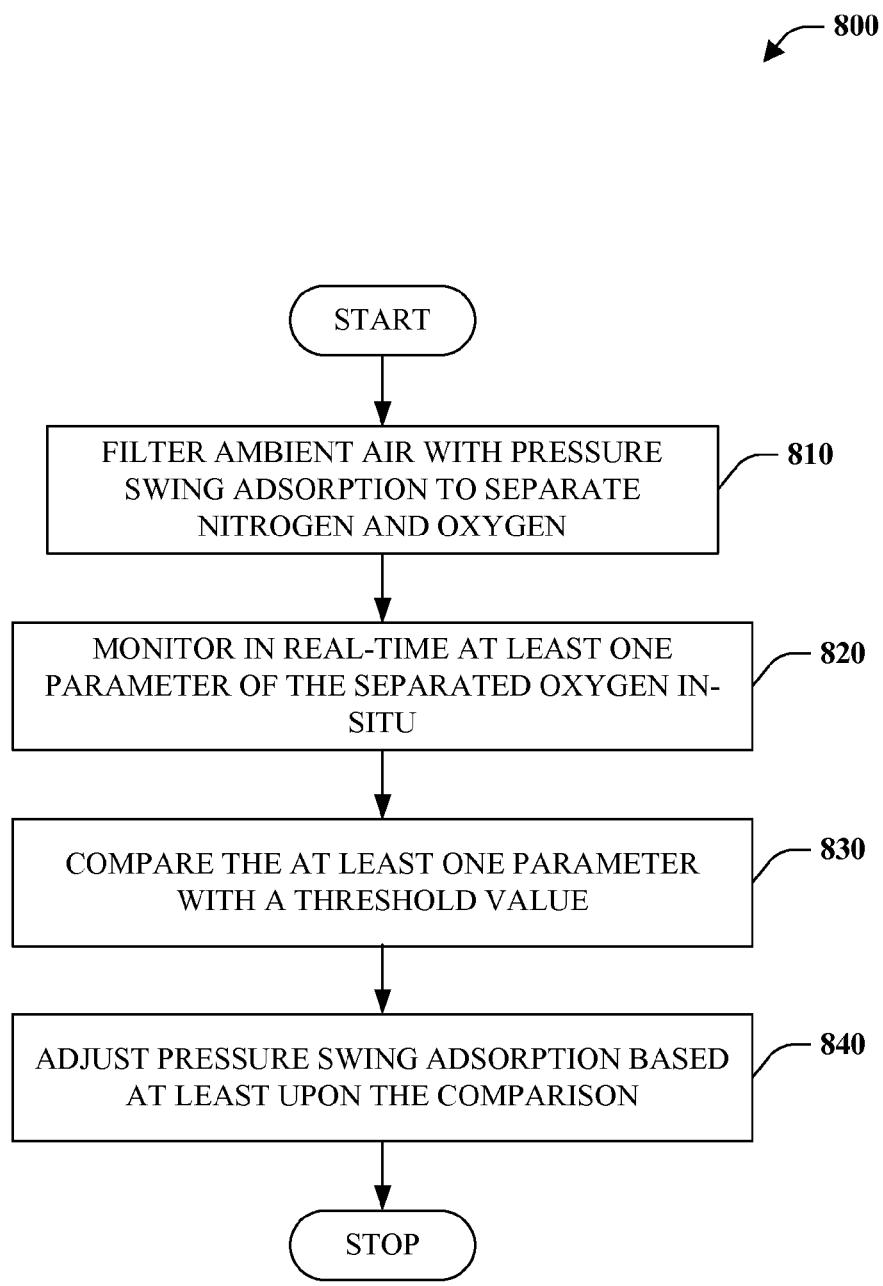
FIG. 8 is a flow chart diagram of a method of adjusting PSA to ensure operation within a threshold value for a particular parameter.
Figure 9:
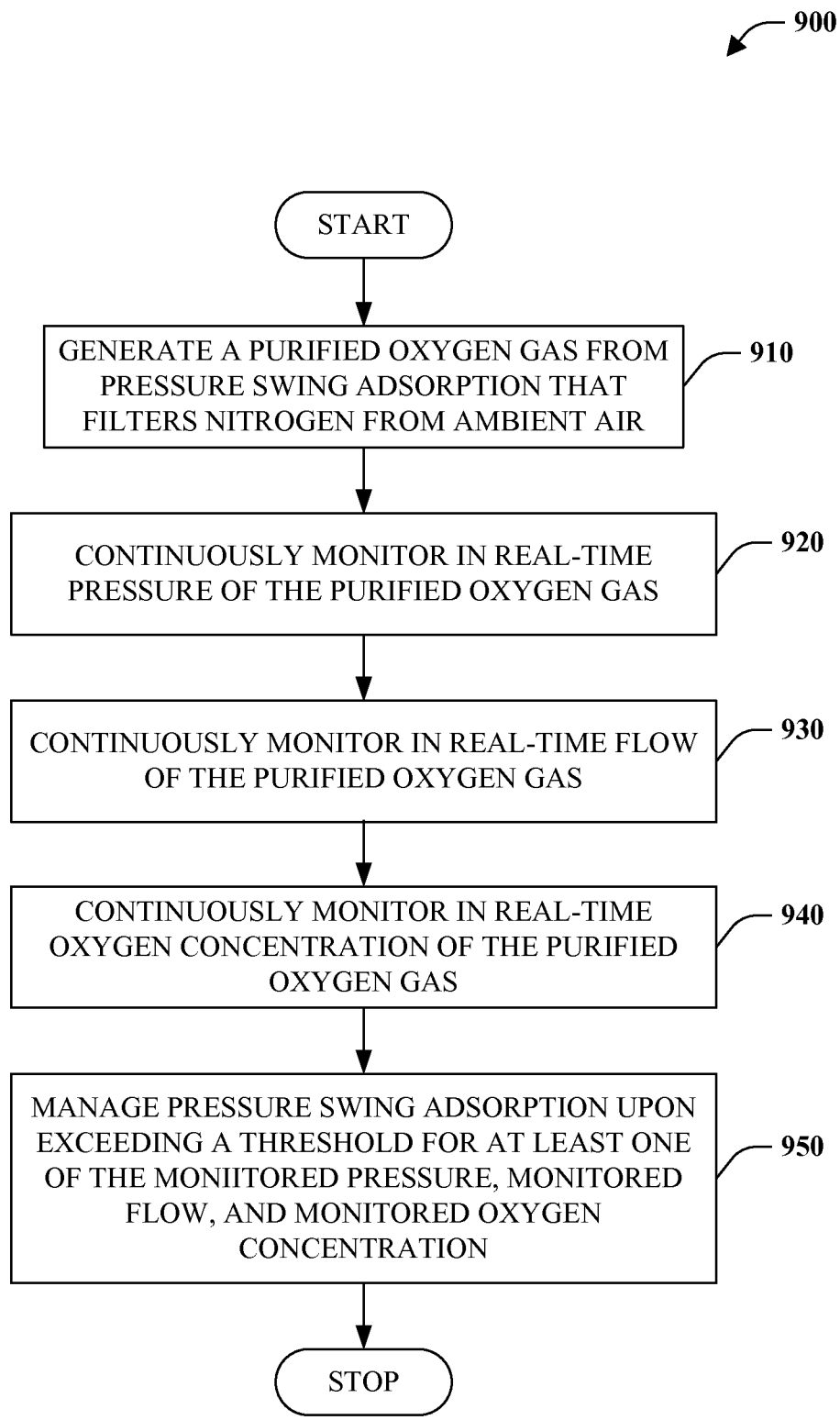
FIG. 9 is a flow chart diagram of a method of generating purified Oxygen via PSA with dynamic and real-time control.

In view of the exemplary systems described supra, methodologies that may be implemented in accordance with the disclosed subject matter will be better appreciated with reference to the flow charts of FIGS. 7-9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 7, a flow chart diagram of a method 700 is illustrated. The method 700 facilitates controlling Pressure Swing Adsorption based upon a monitored real-time parameter. At reference numeral 710, a product gas output can be generated from Pressure Swing Adsorption (PSA). For instance, the product gas output can be, but is not limited to being, Oxygen, Nitrogen, Ammonia, Hydrogen, or methane, among others. At reference numeral 720, at least one parameter associated with the product gas output can be monitored in real-time. By way of example and not limitation, the parameters associated with the product gas can be high pressure values, low pressure values, concentrations of product gas output, flow rate values, operation time/amount for a portion of equipment (e.g., lifespan of a machine, expected maintenance, etc.), temperature, moisture, dew point, debris count associated with filter medium, among others. Moreover, it is to be appreciated that at least one parameter is monitored or detected continuously and in real-time. At reference numeral 730, PSA can be controlled based at least in part upon the monitoring of the at least one parameter. In other words, PSA and/or included equipment can be adjusted in real-time based upon received parameters in order to ensure a level of integrity with the product gas output as well as health of equipment, etc.

FIG. 8 is a flow chart diagram of a method 800 of adjusting PSA to ensure operation within a threshold value for a particular parameter. At reference numeral 810, ambient air can be filtered with Pressure Swing Adsorption (PSA) to separate Nitrogen and Oxygen to produce a purified output gas. It is to be appreciated that PSA can be implemented to generate a purified output of Oxygen or a purified output of Nitrogen based on the type of filter medium. Although the example of generating purified Oxygen is discussed below, the subject innovation is not so limited. In other words, it is to be appreciated and understood that the purified output gas is not to be limiting on the subject innovation and any of Oxygen, Nitrogen, Ammonia, Hydrogen, or methane can be the purified output gas.

At reference numeral 820, at least one parameter of the separated Oxygen can be monitored in situ and in real-time. In other words, a parameter of the purified output gas is detected dynamically and continuously while not disturbing PSA production of purified output gas. For example, the parameter can be, but is not limited to being, a high pressure value of the purified output gas, a low pressure value of the purified output gas, a concentration level of the purified output gas, a flow rate of the purified output gas, among others.

At reference numeral 830, the at least one parameter can be compared with a threshold value. Each parameter can include a corresponding threshold value or range of values. For example, the threshold value can be a value that, if a parameter measures above or below, can indicate a decrease in quality of purified output gas or an increased chance of damage to equipment. It is to be appreciated that the threshold value can be set manually, automatically, based upon historic data, and/or any suitable combination thereof. Moreover, such threshold value(s) can be specific to each PSA environment due to the sensitivity of parameter measurements with varying scale/size of purified gas output. By analyzing or comparing the real-time value of the parameter with a threshold value, a determination can be made as to whether the parameter measurement is acceptable or valid for PSA production of purified gas output.

At reference numeral 840, PSA can be adjusted based at least upon the comparison. It is to be appreciated and understood that each parameter can include a corresponding threshold value. Moreover, it is to be appreciated that each parameter and corresponding comparison can induce a particular adjustment(s) to PSA. For example, if a high pressure value of the purified output gas is above a corresponding threshold value, PSA can be adjusted by reducing the pressure. In other example, a concentration level of the purified output gas may drop below a threshold level indicating a severe fault in which PSA can be halted by shutting down equipment. In general, the real-time monitoring of parameters allow dynamic adjustments to PSA environments in order to achieve optimized performance as well as increased efficiency while reducing potential damage to output gas and equipment.

FIG. 9 is a flow chart diagram of a method 900 of generating purified Oxygen via PSA with dynamic and real-time control. At reference numeral 910, a purified Oxygen gas can be generated from Pressure Swing Adsorption (PSA) that filters Nitrogen from ambient air. For example, a compressor can pressurize ambient air into a filter medium that separates Nitrogen particles from Oxygen particles which results in a purified Oxygen gas. It is to be appreciated that the subject innovation can be utilized with any PSA environment and any production of a purified gas via PSA and a filter medium.

At reference numeral 920, pressure of the purified Oxygen gas can be continuously monitored in real-time. For example, a high pressure of the purified Oxygen gas can be detected in real-time as well as a low pressure of the purified Oxygen gas. Moreover, any suitable pressure sensor (e.g., high pressure sensor, low pressure sensor, etc.) can be utilized in order to employ real-time pressure readings from the purified Oxygen gas. By way of example and not limitation, the high pressure level of the purified Oxygen gas can be monitored in real-time in order to ensure operation of PSA with high pressure levels that do not cause damage to a filter medium and, in turn, to other PSA equipment. In another instance, a low pressure value can be monitored in real-time to ensure that the pressure is at a level that adequately produces purified Oxygen gas. In other words, if pressure is not at a sufficient level, the filtration process associated with PSA may not be effective to generate purified Oxygen gas.

At reference numeral 930, flow (e.g., flow rate) of the purified Oxygen gas can be continuously monitored in real-time. For example, an orifice can be incorporated in-between the gas flow of the purified Oxygen gas in order to identify a reading associated with the rate of flow therewith. It is to be appreciated and understood that any suitable flow rate measurement sensor or technique can be utilized with the subject innovation and such varying techniques or sensors are not to be limiting. For instance, a high flow rate can increase risk and/or damage to a filter medium and other equipment. Therefore, monitoring the flow rate of purified Oxygen gas in real-time can ensure a flow rate that will not damage PSA equipment such as a filter medium.

At reference numeral 940, Oxygen concentration of the purified Oxygen gas can be continuously monitored in real-time. By way of example and not limitation, the concentration of the purified Oxygen can be an indicator of a potential failure of PSA (e.g., equipment, devices, components, filter medium, etc.). For instance, prior to a "crack" or "crush" in a filter medium, the concentration of a purified gas output generated via PSA will decrease. Thus, if the concentration of the purified Oxygen gas is monitored in real-time, any changes in the concentration can be detected which can lead to a more efficient product line (e.g., PSA environment). In other words, real-time tracking of a concentration level of purified Oxygen (e.g., or any other purified gas output) allows preventative adjustments in order to handle a possible filter medium "crack" or "crush" scenario.

As used herein, the terms "component" and "system," as well as forms thereof are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 10:
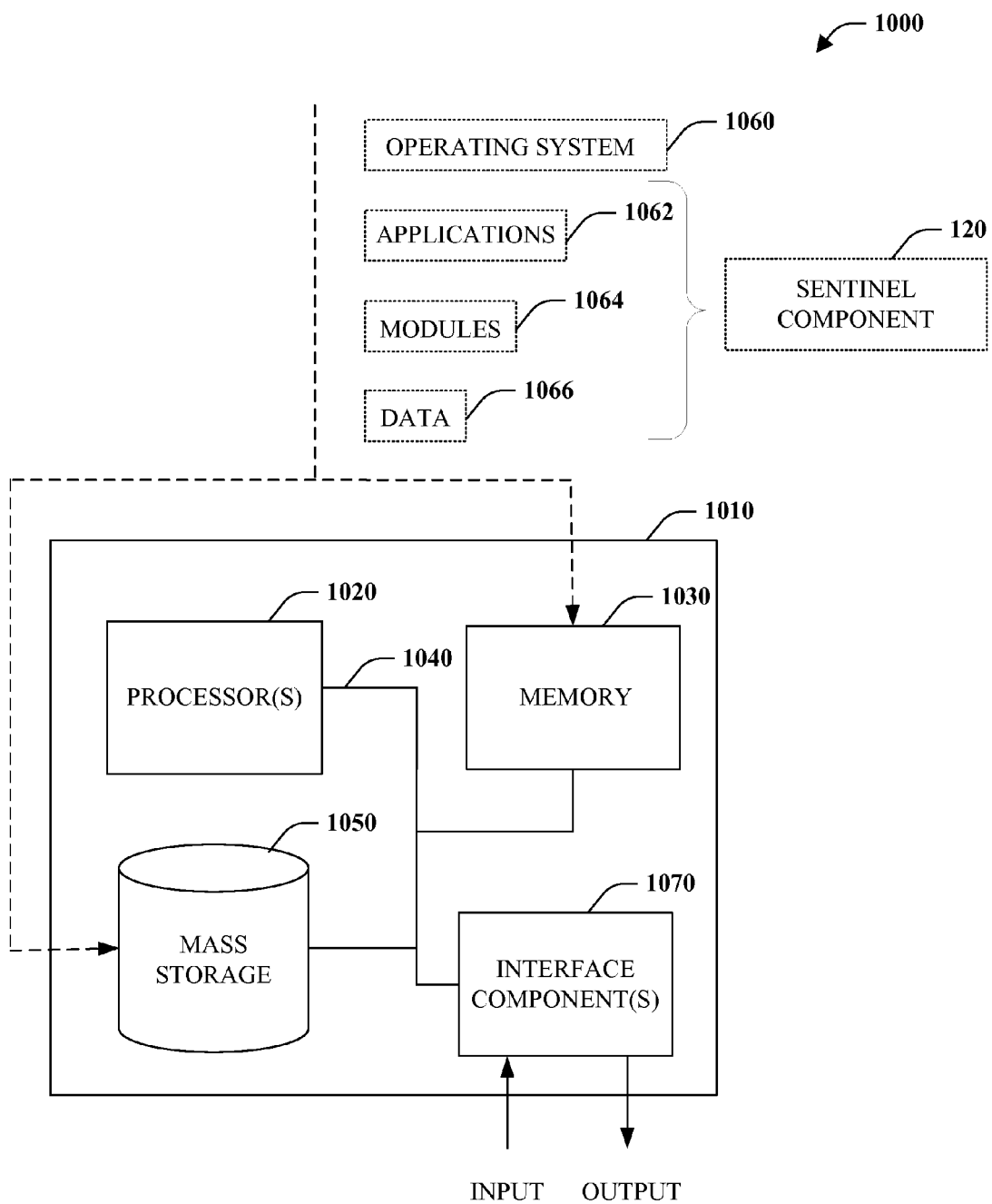
FIG. 10 is a schematic block diagram illustrating a suitable operating environment for aspects of the subject disclosure.

In order to provide a context for the claimed subject matter, FIG. 10 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 10, illustrated is an example general-purpose computer 1010 or computing device (e.g., desktop, laptop, server, hand-held, programmable consumer or industrial electronics, set-top box, game system . . . ). The computer 1010 includes one or more processor(s) 1020, memory 1030, system bus 1040, mass storage 1050, and one or more interface components 1070. The system bus 1040 communicatively couples at least the above system components. However, it is to be appreciated that in its simplest form the computer 1010 can include one or more processors 1020 coupled to memory 1030 that execute various computer executable actions, instructions, and or components stored in memory 1030.

The processor(s) 1020 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1020 may also be implemented as a combination of computing devices, for example a combination of a DSP and a microprocessor, a plurality of microprocessors, multi-core processors, one or more microprocessors in conjunction with a DSP core, or any other such configuration.

The computer 1010 can include or otherwise interact with a variety of computer-readable media to facilitate control of the computer 1010 to implement one or more aspects of the claimed subject matter. The computer-readable media can be any available media that can be accessed by the computer 1010 and includes volatile and nonvolatile media, and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ). ), or any other medium which can be used to store the desired information and which can be accessed by the computer 1010.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1030 and mass storage 1050 are examples of computer-readable storage media. Depending on the exact configuration and type of computing device, memory 1030 may be volatile (e.g., RAM), non-volatile (e.g., ROM, flash memory . . . ) or some combination of the two. By way of example, the basic input/output system (BIOS), including basic routines to transfer information between elements within the computer 1010, such as during start-up, can be stored in nonvolatile memory, while volatile memory can act as external cache memory to facilitate processing by the processor(s) 1020, among other things.

Mass storage 1050 includes removable/non-removable, volatile/nonvolatile computer storage media for storage of large amounts of data relative to the memory 1030. For example, mass storage 1050 includes, but is not limited to, one or more devices such as a magnetic or optical disk drive, floppy disk drive, flash memory, solid-state drive, or memory stick.

Memory 1030 and mass storage 1050 can include, or have stored therein, operating system 1060, one or more applications 1062, one or more program modules 1064, and data 1066. The operating system 1060 acts to control and allocate resources of the computer 1010. Applications 1062 include one or both of system and application software and can exploit management of resources by the operating system 1060 through program modules 1064 and data 1066 stored in memory 1030 and/or mass storage 1050 to perform one or more actions. Accordingly, applications 1062 can turn a general-purpose computer 1010 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the sentinel component 120, or portions thereof, can be, or form part, of an application 1062, and include one or more modules 1064 and data 1066 stored in memory and/or mass storage 1050 whose functionality can be realized when executed by one or more processor(s) 1020.

In accordance with one particular embodiment, the processor(s) 1020 can correspond to a system on a chip (SOC) or like architecture including, or in other words integrating, both hardware and software on a single integrated circuit substrate. Here, the processor(s) 1020 can include one or more processors as well as memory at least similar to processor(s) 1020 and memory 1030, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the sentinel component 120 and/or associated functionality can be embedded within hardware in a SOC architecture.

The computer 1010 also includes one or more interface components 1070 that are communicatively coupled to the system bus 1040 and facilitate interaction with the computer 1010. By way of example, the interface component 1070 can be a port (e.g., serial, parallel, PCMCIA, USB, FireWire . . . ) or an interface card (e.g., sound, video . . . ) or the like. In one example implementation, the interface component 1070 can be embodied as a user input/output interface to enable a user to enter commands and information into the computer 1010 through one or more input devices (e.g., pointing device such as a mouse, trackball, stylus, touch pad, keyboard, microphone, joystick, game pad, satellite dish, scanner, camera, other computer . . . ). In another example implementation, the interface component 1070 can be embodied as an output peripheral interface to supply output to displays (e.g., CRT, LCD, plasma . . . ), speakers, printers, and/or other computers, among other things. Still further yet, the interface component 1070 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method of facilitating producing a purified gas output, comprising:
generating a purified gas output via a Pressure Swing Adsorption (PSA) from an ambient air that includes the following:

pressurizing a first adsorption vessel to force the ambient air into a first filter medium, wherein the ambient air includes a portion of Nitrogen and a portion of Oxygen;
adsorbing the portion of Nitrogen from the ambient air into the first filter medium; and
de-adsorbing the portion of Oxygen from the ambient air via the first filter medium to produce the purified gas output;
monitoring in situ the purified gas output in real-time to detect a parameter associated with the PSA, wherein real-time is a time at which the purified gas output is received from the first filter medium;
the step of monitoring in situ the purified gas output includes utilizing an orifice in between a high pressure sensor and a low pressure sensor to detect the parameter of the purified gas output;
dynamically analyzing the real-time parameter associated with the PSA to a threshold value;
controlling the PSA based at least in part upon the in situ real-time monitoring of the purified gas output;
controlling a compressor that distributes the ambient air into the first filter medium based on the dynamically analyzing of the real-time parameter; and
de-activating an equipment that is down-the-line from the PSA and uses the purified gas output, wherein the deactivating of the equipment is based on the dynamically analyzing of the real-time parameter.

2. The method of claim 1, wherein the parameter is at least one of a pressure of the purified gas output, a flow rate of the purified gas output, or a concentration of the purified gas output from the first filter medium associated with the PSA.

3. The method of claim 2 further comprises evaluating more than one parameter in order to identify a deterioration of the first filter medium associated with the PSA.

4. The method of claim 1 further comprises controlling the PSA with a regulation of at least one of the following: a power supply; a flow rate of a gas input; a flow rate of the purified gas output; a pressure value of a gas input; a pressure value of the purified gas output; or a concentration target value of the purified gas output.

5. The method of claim 1 further comprises generating an alarm notification based at least in part upon dynamically analyzing the parameter associated with the PSA.

6. The method of claim 5 further comprises displaying at least one of the alarm notification or a reading of the parameter in real-time.

7. The method of claim 1 further comprises:
receiving an output from a component included in a product line that produces the purified gas output via the PSA; and
managing an activation and a de-activation of at least one of the PSA or the component based upon monitoring at least one of the parameter or the output.

8. The method of claim 1 further comprises activating the equipment that is down-the-line that utilizes the purified gas output.

9. The method of claim 1 further comprises a second adsorption vessel that is configured for continuous use of producing the purified gas output.

10. The method of claim 1, the parameter is an amount of debris from the first filter medium associated with the PSA.

11. A system that facilitates filtering particles with a Pressure Swing Adsorption (PSA), comprising:
a first adsorption vessel that is pressurized to force a first set of molecules into a first filter medium, the first set of molecules is adsorbed into the first filter medium and a second set of molecules is de-adsorbed from the first filter medium to produce a purified gas which includes the second set of molecules;
a sentinel component that dynamically and continuously tracks a real-time concentration level for the purified gas, wherein the sentinel component includes:
a high pressure sensor that monitors a real-time high pressure level for the purified gas;
a low pressure sensor that monitors a low pressure level for the purified gas; and
an orifice affixed in-between the high pressure sensor and the low pressure sensor, the purified gas passes through the high pressure sensor from the first filter medium, through the orifice, and through the low pressure sensor to track a real-time flow rate of the purified gas;
the sentinel component further de-activates the first adsorption vessel based at least in part upon the real-time concentration level for the purified gas;
the sentinel component monitors an amount of debris from the first filter medium; and
the sentinel component controls at least one of the activation or the de-activation of the first adsorption vessel based on the amount of debris.

12. The system of claim 11, the sentinel component controls at least one of the activation or the de-activation of the first adsorption vessel based at least in part upon at least one of the real-time high pressure level or the low real-time pressure level.

13. The system of claim 11, the sentinel component controls the at least one of the activation or the de-activation of the first adsorption vessel based at least in part upon the real-time flow rate of the purified gas.

14. The system of claim 13 further comprises an alarm component that triggers an alarm notification based upon at least one of the following:
the concentration level for the purified molecule decreases below a concentration threshold value;
the high pressure value for the purified molecule increases above a high pressure threshold value;
the low pressure value for the purified molecule decreases below a low pressure threshold value; or
the flow rate for the purified molecule increases above a flow rate threshold value.

15. The system of claim 14, wherein the sentinel component analyzes the concentration level, the high pressure value, the low pressure value, and the flow rate to detect a deterioration of the first filter medium.

16. The method of claim 11 further comprises a second adsorption vessel that is configured for continuous use of producing the purified molecule.

17. A method of facilitating producing a purified gas output, comprising:
generating a purified Oxygen gas via a Pressure Swing Adsorption (PSA) that separates Nitrogen from an ambient air with a first Zeolite filter medium that includes the following:
pressurizing a first adsorption vessel to force the ambient air into the first Zeolite filter medium;
adsorbing a portion of Nitrogen from the ambient air into the first Zeolite filter medium; and
de-adsorbing a portion of Oxygen from the ambient air via the first Zeolite filter medium to produce the purified Oxygen gas;
monitoring in situ the purified Oxygen gas in real-time to detect at least one of a pressure of the purified Oxygen gas, a flow rate of the purified Oxygen gas, or a concentration of the purified Oxygen gas, wherein the step of monitoring includes:
receiving the purified Oxygen gas from the first filter medium;
passing the purified Oxygen gas though a high pressure sensor;
passing the purified Oxygen gas through an orifice; and
passing the purified Oxygen gas through a low pressure sensor, wherein
the orifice is in-between the high pressure sensor and the low pressure sensor;
controlling the PSA based at least in part upon the in situ and real-time monitoring of at least one of a pressure of the purified Oxygen gas, a flow rate of the purified Oxygen gas, or a concentration of the purified Oxygen gas; and
de-activating an equipment that is down-the-line from the PSA and uses the purified Oxygen gas, wherein the de-activating of the equipment is based on the dynamically analyzing of the real-time parameter.

18. The method of claim 17 further comprises comparing at least one of the real-time pressure of the purified Oxygen gas, the real-time flow rate of the purified Oxygen gas, or the real-time concentration of the purified Oxygen gas to a respective range of values tolerable for the PSA.

19. The method of claim 17 further comprises disabling a power supply for the PSA in order to halt generation of the purified Oxygen gas, the disabling of the power supply is based upon the in situ, real-time monitoring of the pressure of the purified Oxygen gas, the flow of the purified Oxygen gas, and the concentration of the purified Oxygen gas.

20. The method of claim 17 further comprises a second adsorption vessel that is configured for continuous use of producing the purified Oxygen gas.

* * * * *